Patented Apr. 24, 1951

2,550,416

UNITED STATES PATENT OFFICE 2,550,416

HYDROCARBON SYNTHESIS CATALYST

Charles N. Kimberlin, Jr., Baton Rouge, La., assignor to Standard Oil Development Company, a corporation of Delaware No Drawing. Original application May 21, 1946, Serial No. 671,415. Divided and this application March 20, 1947, Serial No. 736,116

2 Claims. (Cl. 252—441)

This is a division of my co-pending application Serial No. 671,415, filed May 21, 1946, now abandoned.

The present invention relates to an improved catalyst. The invention is more particularly concerned with an improved fluid catalyst suitable for conducting a hydrocarbon synthesis reaction. In accordance with the present invention, an improved fluid catalyst comprising iron is produced by utilizing iron oxide in conjunction with inorganic materials such as sodium or potassium silicates. These catalysts comprising iron and sodium or potassium silicate are entirely suitable and may be utilized in fluid operations and are particularly desirable for use in a fluid Fischer synthesis process.

It is well known in the art to conduct various synthesis operations. In these operations gases comprising oxides of carbon and hydrogen are treated under various temperatures and pressures in the presence of suitable catalysts in order to produce hydrocarbon reaction products containing more than one carbon atom in the molecule. The temperatures and pressures employed vary widely and depend upon, among other factors, the particular catalyst employed, the character of the feed and the final products desired. The catalysts, however, generally comprise a metal of the iron group, as for example, iron, cobalt or nickel. These catalysts are prepared in any suitable manner. For example, an iron catalyst is usually prepared by roasting the pyrites or iron sulfide at a temperature in the range from about 1200° F. to 1500° F. The resulting iron oxide is reduced with hydrogen under suitable temperature and pressure conditions generally in the range from about 600° F. to 900° F. at a pressure in the range of 100 to 200 pounds per square inch under conditions to produce the desired iron catalyst. Iron catalysts are also secured by precipitation methods.

While these processes for producing the iron catalysts are entirely satisfactory wherein a fixed bed type operation is employed, they are not entirely suitable for producing a fluid type catalyst. In a fluid type operation it is desirable that the size of the catalyst vary in the range from about 10 microns to 200 microns and higher, preferably in the range from about 20 microns to 80 microns. This is necessary in order to get the desired size with respect to density and the superficial velocity of the gas so that fluidity of the solid particles is secured.

A reduced red iron oxide is a very desirable catalyst for conducting a Fischer synthesis reaction. The red iron oxide is usually obtained by calcining ferrous sulphate at about 1300° F. or higher. It is also sometimes obtained by roasting ferrous oxalate or by heating precipitated ferric hydroxide. However, it has heretofore been impractical to employ this particular catalyst in a fluid Fischer synthesis operation since the particles are too fine. When attempting to use the too fine particles the catalyst bed does not become properly "fluidized" with the result that the phenomenon called slugging occurs, i. e., the solid catalyst particles and the reacting gases do not distribute themselves evenly throughout the catalyst bed. There exists the appearance of large bubbles of gas percolating upwardly through a densely packed bed of catalyst; whereas, a properly fluidized bed has the appearance of a boiling liquid with the catalyst loosely packed. The individual catalyst particles appear to be separated by layers of gas with no large bubbles of gas in evidence. Another objection to a too fine particle size is the fact that this results in a very high rate of entrainment of catalyst by the gas.

In accordance with my invention, I prepare a suitable reduced red iron oxide catalyst which may be readily adapted to a fluid type operation. In accordance with my process, I treat the red iron oxide with a material such as sodium or potassium silicate. My process is also adapted for the treatment of magnetic iron oxide ($Fe_3O_4$). These oxides are characterized by the ease with which their particle size is degraded. When attempts are made to grind coarse lumps of these oxides it is difficult, if not impossible, to prevent the disintegration from proceeding too far.

The catalysts of my invention may be prepared by any suitable means. However, a preferred method is as follows: The red iron oxide is secured as an ore or obtained synthetically by calcining various compounds of iron. The sodium or potassium silicate is obtained by fusing a mixture of silica with a compound or sodium or potassium. I prefer to employ sodium or potassium carbonate or sulfate. The quantity of materials used is selected so as to give a molecular ratio of silica to alkali oxide between 2 to 3, and 4 to 1. These mixtures upon fusion form glasses which can be dissolved in water.

In accordance with one modification of my invention, the iron oxide is mixed with a solution of the silicate to form a paste or mud. The paste or mud is dried and then heated to a temperature in the range of about 1100° F. to 1600° F., preferably about 1400° F. This forms hard, porous lumps of material which are then ground to suitable size. Materials too fine for use, formed during the grinding operation, are screened and added to a fresh charge of the iron oxide.

My invention may be readily understood by reference to the following examples illustrating the same:

Example I

Red iron oxide of pigment grade which consisted of extremely finely divided powder was mixed with a sodium silicate 40° Bé. solution. The ratio of silica to soda was 3.25 to 1. The sodium silicate solution and the red iron oxide pigment were mixed to form a paste. This paste was dried in a steam oven and placed in a muffle furnace and heat treated at a temperature of 1150° F. The final composition of the catalyst before reduction was 86.50% $Fe_2O_3$, 13.5% $Na_2O.3.25 SiO_2$.

The resulting lumps were ground to form particles having a particle size in the range from about 20 to 160 microns. When these particles were tested under aeration conditions fluidity of the catalyst was secured. The fluidized bed had the appearance of a boiling liquid and the catalyst was loosely packed.

Example II

In another operation, the catalyst prepared as described in Example I was reduced to 6 to 16 mesh size. This catalyst was reduced with hydrogen at 900° F. The catalyst was placed in a bed and feed gases comprising oxides of carbon and hydrogen passed through the bed. A temperature of 575° F. and a pressure of 250 pounds per square inch were employed. The feed rate was 215 volumes of feed gases per volume of catalyst per hour. The mol ratio of hydrogen to carbon monoxide in the feed gases was 1.2 to 1. The yield of butane and higher boiling hydrocarbons secured was 155 cc. per cubic meter of synthesis gas consumed.

The process of my invention may be widely varied. In its broadest scope my invention comprises a fluid catalyst comprising iron oxide, preferably red iron oxide and a sodium or potassium silicate. The range of sodium or potassium may be widely varied. In general, I prefer to employ sodium or potassium silicate having a molar ratio of silica to alkali oxide in the range of 1 to 1, to 1 to 4. The quantity of silicate used is preferably selected so that the product will have an alkali content in the range of about 1 to 10%.

It is also within the scope of my invention to employ added promoters or the like such as alumina or alkali fluorides, etc.

The present invention is not to be limited by any theory as to mode of operation but only in and by the following claims in which it is desired to claim all novelty inherent insofar as the prior art permits.

What I claim is:

1. An improved powdered iron catalyst adapted for use in the synthesis of hydrocarbons by the reduction of the oxides of carbon with hydrogen, which catalyst is derived from one of the class consisting of red iron oxide and magnetic iron oxide, further characterized in those features consisting in that the catalyst is bonded together by means of an alkali metal silicate, contains a promotional amount of an alkali metal fluoride, is heat treated in the oxide form at a temperature within the range of from about 1100° to 1600° F., is further subjected to a reduction treatment in which the said iron oxide is substantially completely reduced to the metallic state and is further characterized in that the catalyst composition is ground to an average particle size adapted for good fluidization.

2. The catalyst of claim 1 containing sodium silicate in an amount equal to from about 1 to 10% by weight of the total catalyst composition.

CHARLES N. KIMBERLIN, JR.

REFERENCES CITED

The following references are of record in the file of this patent:

UNITED STATES PATENTS

| Number | Name | Date |
| --- | --- | --- |
| 2,017,428 | Almquist | Oct. 15, 1935 |
| 2,063,302 | Eversole | Dec. 8, 1936 |
| 2,254,806 | Michael | Sept. 2, 1941 |
| 2,276,679 | Abbott | Mar. 17, 1942 |
| 2,287,891 | Linckh | June 30, 1942 |
| 2,383,643 | Fulton et al. | Aug. 28, 1945 |
| 2,391,116 | Ashley | Dec. 18, 1945 |
| 2,417,164 | Huba | Mar. 11, 1947 |
| 2,461,147 | Davies | Feb. 8, 1949 |